United States Patent [19]
Ringle

[11] Patent Number: 5,190,346
[45] Date of Patent: Mar. 2, 1993

[54] ADJUSTABLE WRAPAROUND BICYCLE SEAT POST CLAMPING APPARATUS WITH A SINGLE FASTENER

[76] Inventor: Geoffrey F. Ringle, 203 Afton Ave., Trenton, N.J. 08618

[21] Appl. No.: 912,560

[22] Filed: Jul. 13, 1992

[51] Int. Cl.$^5$ ............................................. B62J 1/00
[52] U.S. Cl. .................................... 297/195; 248/291; 403/391; 403/84; 403/24
[58] Field of Search ............. 297/195; 248/291, 316.1, 248/225.31; 403/391, 87, 84, 24

[56] References Cited

U.S. PATENT DOCUMENTS

| | | |
|---|---|---|
| 2,710,207 | 6/1955 | Mueller . |
| 3,501,119 | 3/1970 | Rich, Jr. . |
| 3,849,008 | 11/1974 | Boucher et al. . |
| 3,891,333 | 6/1975 | Cordevack . |
| 3,933,391 | 1/1976 | Shook . |
| 3,992,054 | 11/1976 | Campagnolo . |
| 4,108,462 | 8/1978 | Martin . |
| 4,155,590 | 5/1979 | Cunningham . |
| 4,180,345 | 12/1979 | Routens . |
| 4,275,922 | 6/1981 | Juy . |
| 4,369,999 | 1/1983 | Kashima . |
| 4,421,357 | 12/1983 | Shimane . |
| 4,440,440 | 4/1984 | Juy . |
| 4,453,765 | 6/1984 | Kashima . |
| 4,502,811 | 3/1985 | Patriarca . |
| 4,568,121 | 2/1986 | Kashima . |
| 4,693,627 | 9/1987 | Borremeo . |
| 4,768,826 | 9/1988 | Kashima . |
| 4,772,069 | 9/1988 | Szymski . |
| 4,773,705 | 9/1988 | Terranova . |
| 4,783,119 | 11/1988 | Moses . |
| 4,836,604 | 6/1989 | Romano . |
| 4,850,733 | 7/1989 | Shook . |
| 4,877,286 | 10/1989 | Hobson et al. . |
| 4,909,522 | 3/1990 | Flanigan . |
| 4,919,378 | 4/1990 | Iwasaki et al. . |
| 4,978,167 | 12/1990 | Harvey . |
| 4,983,663 | 1/1991 | Phillips . |
| 4,987,764 | 1/1991 | Chen . |
| 4,995,753 | 2/1991 | Shook . |
| 5,020,851 | 6/1991 | Chen . |
| 5,033,790 | 7/1991 | Schilplin et al. . |
| 5,048,891 | 9/1991 | Yach . |

FOREIGN PATENT DOCUMENTS

| | | | |
|---|---|---|---|
| 56-48348 | 11/1981 | Japan | 297/195 |
| 1265078 | 10/1986 | U.S.S.R. | 297/195 |

*Primary Examiner*—Laurie K. Cranmer
*Attorney, Agent, or Firm*—Sperry, Zoda & Kane

[57] ABSTRACT

A lightweight bicycle seat post apparatus with a wraparound clamping device, for use with saddle seats having two parallel mounting rails, which provides detachable secure clamping but allows for adjustment of the angle of seat tilt as well as adjustment of the fore and aft positioning of the seat relative to the seat post by adjustment of only a single bolt.

23 Claims, 3 Drawing Sheets

FIG. 1
FIG. 2
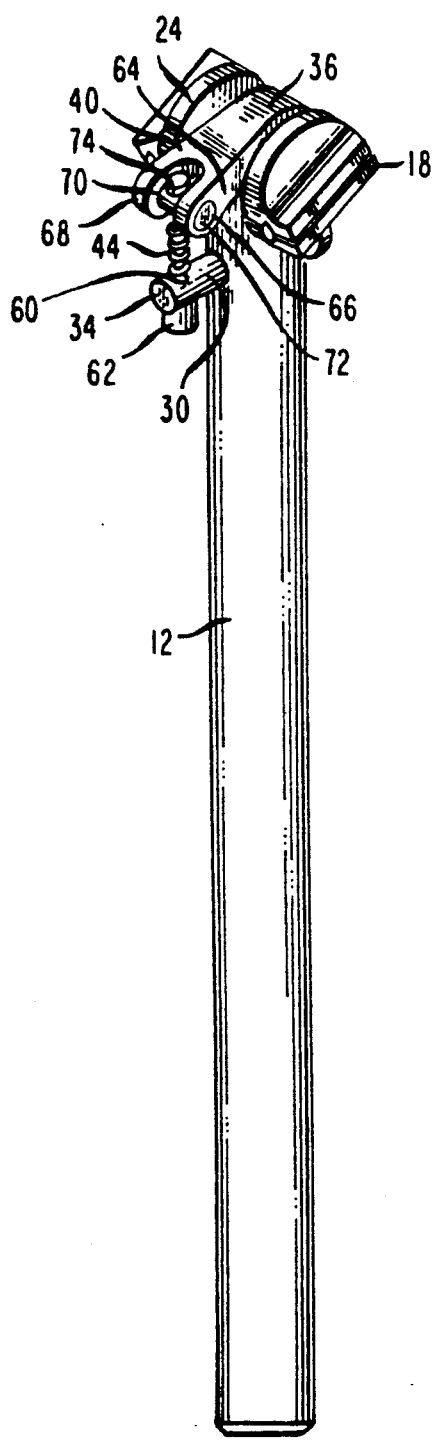
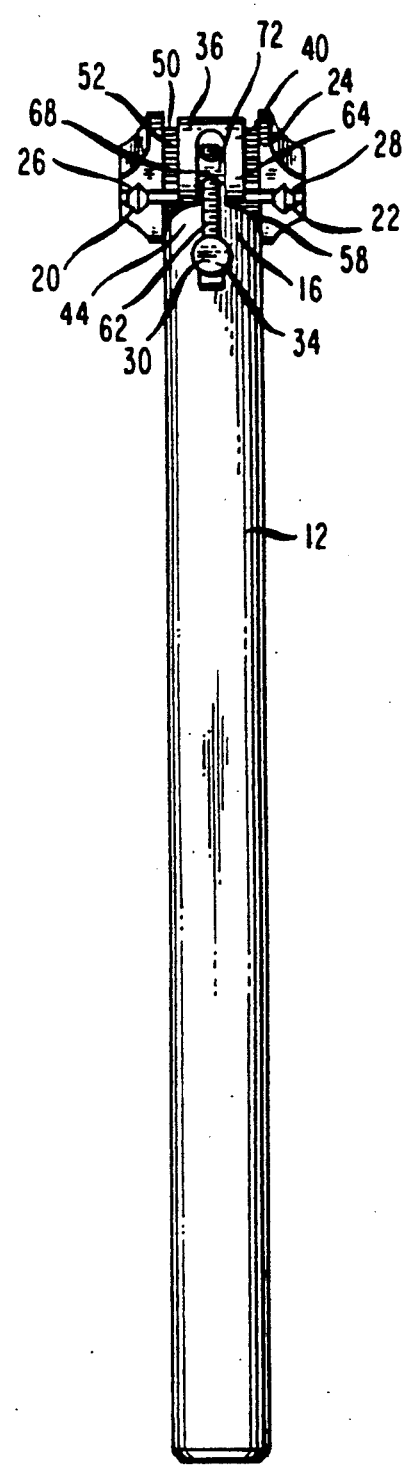

FIG. 3
FIG. 4
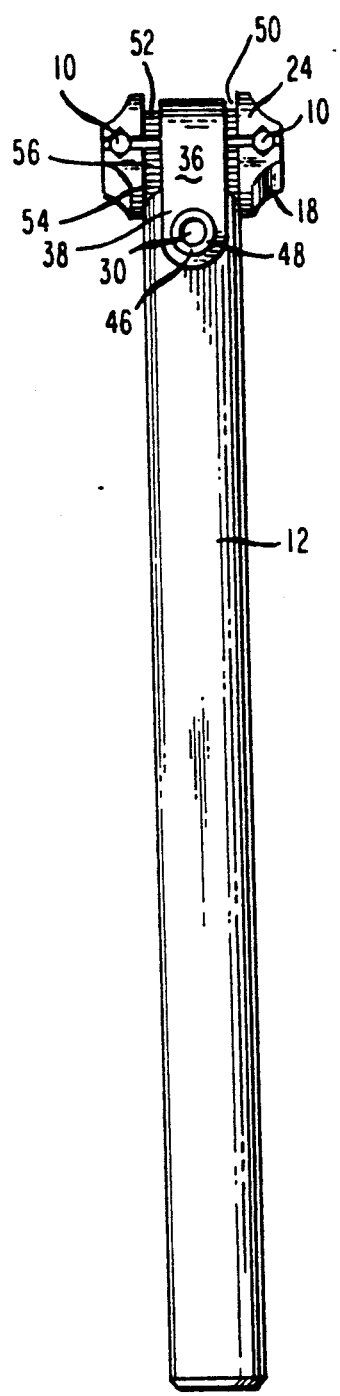
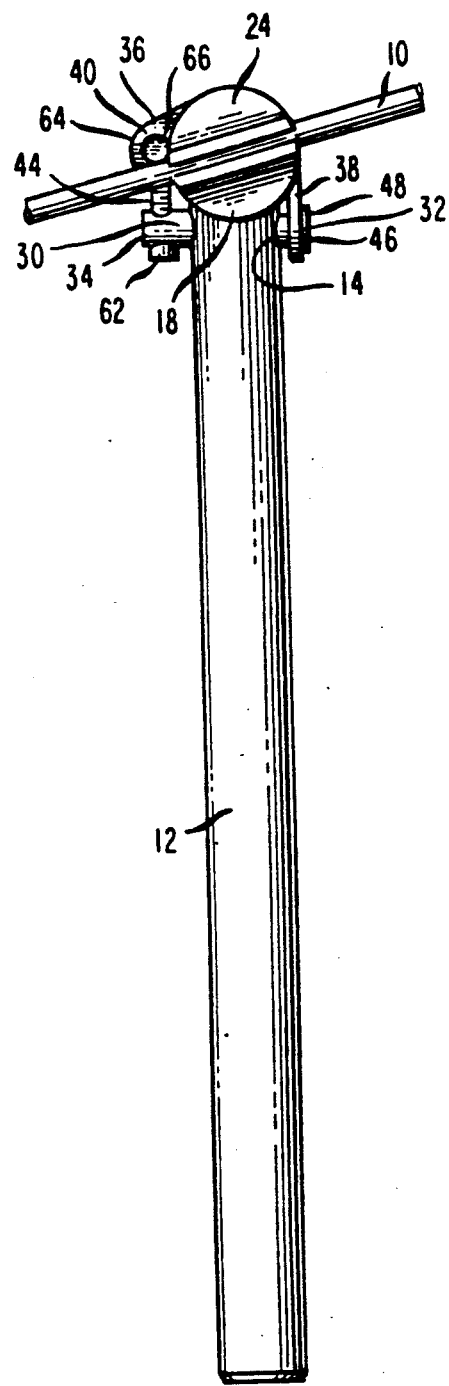

ADJUSTABLE WRAPAROUND BICYCLE SEAT POST CLAMPING APPARATUS WITH A SINGLE FASTENER

BACKGROUND OF THE INVENTION

1. Field Of The Invention

The present invention deals with the field of devices for securement of bicycle seats with respect to a seat mounting post secured with respect to the frame of the bicycle. Such bicycle seats commonly include two longitudinally extending mounting rails both of which must be gripped in order to maintain firm securement of the bicycle seat with respect to the bicycle. The present invention further pertains to the field of devices for providing rotatable adjustment of the bicycle seat to vary the height of the front or rear portion thereof as personally desired in accordance with the specific wishes of the rider.

2. Description Of The Prior Art

Many prior art devices have been designed for facilitating securement of a bicycle seat with respect to a bicycle seat post such as shown in U.S. Pat. No. 2,710,207 patented Jun. 7, 1955 to H. Mueller on a Seat Post Clamp Structure For Bicycles; U.S. Pat. No. 3,501,119 patented Mar. 17, 1970 to M. Rich, Jr. ON a Bicycle Seat Supporting Pivot Means; U.S. Pat. No. 3,849,008 patented Nov. 19, 1974 to R. Boucher et al on a Saddle Support System; U.S. Pat. No. 3,891,333 patented Jun. 24, 1975 to M. Corderack on a Mounting Assembly for Bicycle Saddle or the like; U.S. Pat. No. 3,922,054 patented Nov. 25, 1975 to H. Dechelette on a Printed Circuit Electrical Connector; U.S. Pat. No. 3,933,391 patented Jan. 20, 1976 to W. Shook on a Saddle Seat Mount With Special Support Post And Cooperating Clamp Assembly; U.S. Pat. No. 3,992,054 patented Nov. 16, 1976 to T. Campagnolo on a Bicycle Saddle Support; U.S. Pat. No. 4,108,462 patented Aug. 22, 1978 to L. Martin on a Bicycle Seat And Mounting Therefor; U.S. Pat. No. 4,155,590 patented May 22, 1979 to C. Cunningham on a Bicycle Seat Post; U.S. Pat. No. 4,180,345 patented Dec. 25, 1979 to J. Routens on a Saddle Support For Bicycles And The Like; U.S. Pat. No. 4,275,922 patented Jun. 30, 1981 to H. Juy on a Saddle Shank For Bicycles And Similar Vehicles; U.S. Pat. No. 4,369,999 patented Jan. 25, 1983 to T. Kashima on a Saddle For Bicycle; U.S. Pat. No. 4,421,357 patented Dec. 20, 1983 to K. Shimano on a Saddle Support Device for a Bicycle; U.S. Pat. No. 4,440,440 patented Apr. 3, 1984 to H. Juh on a Saddle Rod For Bicycles And Like Vehicles; U.S. Pat. No. 4,453,765 patented Jun. 12, 1984 to T. Kashima on a Saddle For Bicycle; U.S. Pat. No. 4,502,811 patented Mar. 5, 1985 to J. Patriarca on Adjustable Supports For Cycle Saddles; U.S. Pat. No. 4,568,121 patented Feb. 4, 1986 to T. Kashima on an Angle-Adjustable Saddle; U.S. Pat. No. 4,693,627 patented Sep. 15, 1987 to L. Borromeo on a Device For Fixing The Saddle Of A Bicycle To A Saddle Pillar And For Adjusting The Inclination Of The Saddle; U.S. Pat. No. 4,768,826 patented Sep. 6, 1988 to T. Kashima on a Saddle For Bicycle; U.S. Pat. No. 4,772,069 patented Sept. 20, 1988 to E. Szymski on a Longitudinally Adjustable Saddle Mounting For Cycle-Type Apparatus; U.S. Pat. No. 4,773,705 patented Sep. 27, 1988 to J. Terranova on a Bicycle Seat; U.S. Pat. No. 4,783,119 patented Nov. 8, 1988 to R. Moses on a Lightweight Adjustable Bicycle Saddle Mount; U.S. Pat. No. 4,836,604 patented Jun. 6, 1989 to A. Romano on a Saddle Pillar For Bicycles And The Like Provided With Means For Adjusting The Attitude Of The Saddle; U.S. Pat. No. 4,850,733 patented Jul. 25, 1989 to W. Shook on an Expander For A Seat Post Inserted In A Bicycle Frame Tube; U.S. Pat. No. 4,877,286 patented Oct. 31, 1989 to R. Hobson on an Adjustable Width Bicycle Seat; U.S. Pat. No. 4,909,522 patented Mar. 20, 1990 to R. Flanigan on a Non-Mechanical Bicycle Seat Attachment For Thrust Support; U.S. Pat. No. 4,919,378 patented Apr. 24, 1990 to Y. Iwasaki on a Support Structure For Bicycle Saddle; U.S. Pat. No. 4,978,167 patented Dec. 18, 1990 to H. Harvey on a Bicycle Saddle With Body Support; U.S. Pat. No. 4,983,063 patented Jan. 8, 1991 to T. Phillips on a Bicycle Seat Adapter; U. S. Pat. No. 4,987,764 patented Jan. 29, 1991 to C. Chen on a Method For Manufacturing A Seat Post Of A Bicycle; U.S. Pat. No. 4,995,753 patented Feb. 26, 1991 to W. Shook on a Saddle Support For Bicycles, Motorcycles, And The Like; U.S. Pat. No. 5,020,851 patented Jun. 4, 1991 to K. Chen on a Saddle Support Device For A Bicycle; U.S. Pat. No. 5,033,790 patented Jul. 23, 1991 to F. Schilplin et al on a Seat Post Assembly and U.S. Pat. No. 5,048,891 patented Sep. 17, 1991 to T. Yach on a Seat Position Changing Apparatus For A Bicycle Or Cycle-Type Machine.

SUMMARY OF THE INVENTION

An adjustable wraparound bicycle seat post clamping apparatus with a single fastener usable with conventional bicycle seats which often include longitudinally extending mounting rails which includes a seat post which defines hole therein extending laterally therethrough. The seat post defines an upper post end thereon which may be arcuate. A lower rail clamping member is positioned adjacent the upper post end of the seat post and is adjustably attached thereto. The lower rail clamping member defines a lower rail clamping slot and a first lower rail clamping slot and a second lower rail clamping slot facing upwardly therein which are each adapted to receive one of the conventional pair of longitudinally extending mounting rails of a normal bicycle seat.

In a similar manner an upper rail clamping member is positioned adjacent the lower rail clamping member and defines a first upper rail clamping slot immediately adjacent the first lower rail clamping slot for retaining one of the longitudinally extending mounting rails of a bicycle seat therein. The upper rail clamping member further defining an second upper rail clamping slot immediately adjacent the second lower rail clamping slot for retaining of the other longitudinally extending mounting rail of a conventional bicycle seat therein. In this way fixed securement of a bicycle seat between the lower rail clamping device and the upper rail clamping device is achieved. With the lower rail clamping device being movable with respect to the arcuate upper end of the seat post the bicycle seat will be movably secured with respect to the seat post itself.

With this configuration a rod may be positioned extending through the hole defined in the side of the seat post. This rod is defined to have a first rod end and a second rod end. A wraparound member is formed in an arcuate shape and includes a first wraparound end adjacent the first end of the rod and a second wraparound end on the opposite side of the seat post. The wraparound member defines a rod aperture adjacent the first end therein which is adapted to receive the rod extending therethrough to movably secure the first wraparound end of the wraparound member with respect to the first rod end of the rod. This wraparound member is preferably generally arcuate such as to extend from the first end of the rod over and around the upper rail clamping member and the lower rail clamping member to the opposite side thereof into a position adjacent to the second rod end of the rod means on the opposite side of the seat post.

A detachable securement device is adapted to secure the second rod end of the rod with respect to the second wraparound end of the wraparound member on the opposite side of the seat post from the first rod end. This detachable securement means preferably is a securement bolt which is securable with respect to the second end of the wraparound member to urge the second end of the rod and the second end of the wraparound member toward one another to bias together the upper and lower rail clamping members between the wraparound member and the upper post end of the seat post in such a manner as to detachably and adjustably retain the longitudinally extending mounting rails between the slots defined therein.

The wraparound retaining means adjacent the first rod end preferably takes the form of a lip means extending outwardly therefrom to a diameter greater than the diameter of the rod aperture to thereby movably secure the wraparound member with respect to the rod.

Positioning of the wraparound member is enhanced by the upper rail clamping member defining an upper guide channel therein which is adapted to receive the wraparound member extending therethrough to facilitate engagement of the upper rail clamping member with respect to the wraparound member and to maintain the wraparound member extending directly thereover to facilitate clamping downwardly thereon. To further facilitate engagement between the wraparound member and the upper rail clamping member the base area of the upper guide channel will preferably include serrations therein to facilitate engagement with respect to the wraparound member.

In a similar manner engagement between the lower rail clamping member and the arcuate upper post end is enhanced by a lower guide channel being defined by the lower rail clamping means in the area of abutment with respect to the seat post. This lower guide channel further may include serrations defined in the base area thereof to further facilitate engagement of the seat post with respect to the lower clamping member. Securement of the securement bolt between the second end of the rod and the second end of the wraparound member is enhanced by the configuration for receiving of the bolt in the second wraparound member. Preferably this second wraparound member includes a first ear member with an ear orifice extending laterally therethrough and a second ear member including a second ear orifice extending therethrough. A cylindrical nut is movably secured extending through the first and second ear orifices in such a manner as to present a nut bore in the slot defined between the first and second ear which slot may be threaded to facilitate engagement with respect to the securement bolt extending upwardly from the second end of the rod.

In the preferred configuration of the present invention the upper and lower clamping means are actually identically configured with respect to one another to make these parts interchangeable and to facilitate manufacture. Also the clamping slots defined in each member are positioned to extend parallel with respect to one another to facilitate receiving of the parallel extending mounting rails of the conventional bicycle seat.

It is an object of the present invention to provide an adjustable wraparound bicycle seat post clamping apparatus with a single fastener for use with a bicycle seat having longitudinally extending mounting rails wherein initial cost of parts is minimized.

It is an object of the present invention to provide an adjustable wraparound bicycle seat post clamping apparatus with a single fastener for use with a bicycle seat having longitudinally extending mounting rails wherein time losses due to maintenance are minimized.

It is an object of the present invention to provide an adjustable wraparound bicycle seat post clamping apparatus with a single fastener for use with a bicycle seat having longitudinally extending mounting rails wherein financial costs of maintenance are minimized.

It is an object of the present invention to provide an adjustable wraparound bicycle seat post clamping apparatus with a single fastener for use with a bicycle seat having longitudinally extending mounting rails wherein the total weight of the mounting mechanism is minimized.

It is an object of the present invention to provide an adjustable wraparound bicycle seat post clamping apparatus with a single fastener for use with a bicycle seat having longitudinally extending mounting rails wherein reliability of detachable securement and adjustability is maximized.

It is an object of the present invention to provide an adjustable wraparound bicycle seat post clamping apparatus with a single fastener for use with a bicycle seat having longitudinally extending mounting rails wherein a single securement means or bolt can be attached or loosened to facilitate adjustment and/or removal of a conventionally configured bicycle seat from the bicycle seat post of the present invention.

It is an object of the present invention to provide an adjustable wraparound bicycle seat post clamping apparatus with a single fastener for use with a bicycle seat having longitudinally extending mounting rails wherein ease and expense of manufacture is minimized.

It is an object of the present invention to provide an adjustable wraparound bicycle seat post clamping apparatus with a single fastener for use with a bicycle seat having longitudinally extending mounting rails wherein easy adjustment by the rider can be performed with common materials and parts.

It is an object of the present invention to provide an adjustable wraparound bicycle seat post clamping apparatus with a single fastener for use with a bicycle seat having longitudinally extending mounting rails wherein complicated castings for parts are not required.

It is an object of the present invention to provide an adjustable wraparound bicycle seat post clamping apparatus with a single fastener for use with a bicycle seat having longitudinally extending mounting rails which has loadbearing capabilities sufficient to meet the varied needs of mountain, racing and touring bicycles.

It is an object of the present invention to provide an adjustable wraparound bicycle seat post clamping apparatus with a single fastener for use with a bicycle seat having longitudinally extending mounting rails which is adjustable to all possible positions of usage both linearly and angularly in the plane of the bicycle frame.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a three-quarter perspective illustration of an embodiment of the wraparound bicycle seat post clamping apparatus with a single fastener of the present invention;

FIG. 2 is a front plan view of the embodiment shown in FIG. 1;

FIG. 3 is a rear plan view of the embodiment shown in FIG. 1;

FIG. 4 is a side plan view of the embodiment shown in FIG. 1; and

DETAILED DESCRIPTION OF THE PREFERRED EMBODIMENT

Figure 5:
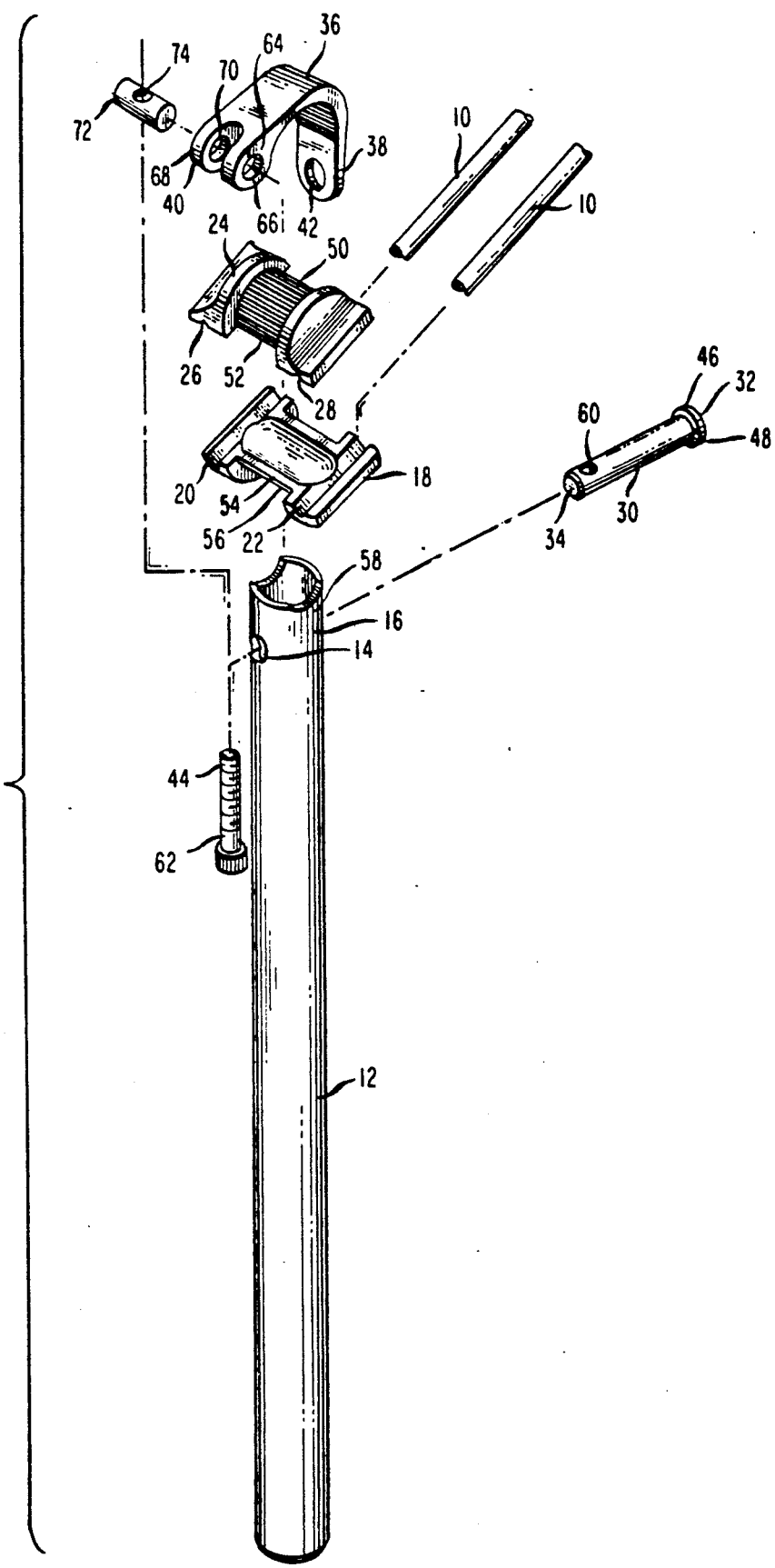
FIG. 5 is an exploded view showing the individual parts of an embodiment of the configuration shown in FIG. 1.

The adjustable wraparound bicycle seat post of the present invention is adapted to be used with a conventional bicycle seat having mounting rails 10 adapted to be adjustably secured with respect to a seat post 12.

The seat post 12 preferably defines a hole means 14 extending laterally therethrough adjacent the upper post end 16 thereof. This upper post end 16 preferably has an arcuate upper surface to facilitate adjustable attachment with respect to the seat post clamping apparatus. The hole means 14 extending through the upper post end 16 of seat post 12 is adapted to receive a rod means 30 extending therethrough. The rod 30 includes a first rod end 32 extending out of one end of the hole means 14 and a second rod end 34 extending out of the other end of the hole means 14.

A lower rail clamping means 18 is positioned in abutment with respect to the arcuate upper surface 58 of the upper post end 16. This lower rail clamping member will preferably include a first lower rail clamping slot means 20 and a second lower rail clamping slot means 22 which extend generally parallel with respect to one another and are adapted to receive the longitudinally extending mounting rails of the conventional bicycle seat therein.

An upper rail clamping member 24 is positioned adjacent the lower rail clamping member 18 and includes a first upper rail clamping slot 26 and a second upper rail clamping slot means 28 therein. With the lower rail clamping member 18 positioned adjacent the upper rail clamping member 24 the first lower rail clamping slot 20 will be adjacent the first upper rail clamping slot 26 and in a similar manner the second lower rail clamping slot 22 will be positioned adjacent the second upper rail clamping slot 28.

With this configuration one of the mounting rails 10 will be adapted to be positioned between the lower rail clamping member 18 and the upper rail clamping member 24 between the first lower rail clamping slot 20 and a first upper rail clamping slot 26. With this configuration the mounting rail 10 will be wedged in positioned between these two slots and be detachably secured therein.

In a similar manner the second lower rail clamping slot 22 is adapted to be positioned adjacent the second upper rail clamping slot 28 in such a manner as to secure one of the mounting rails 10 therebetween. Thus with the lower rail clamping means 18 wedged biased toward the upper rail clamping means 24 both of the generally parallel longitudinally extending mounting rails 10 will be wedged therein with the lower rail clamping means 18 in movable abutment with respect to the arcuate upper surface 58 of the upper post end 16.

To affix the clamping members with respect to one another and with respect to the seat post 12 a wraparound member 36 is positioned with the first wraparound end 38 thereof movably secured with respect to the first rod end 32 of rod 30. The wraparound member 36 will be generally arcuate to extend upwardly from the first rod end 32 around both the upper rail clamping means 24 and the lower rail clamping means 18 to the opposite side of the seat post means 12 to a position near the second rod end 34 of rod means 30 extending out of the other end of hole means 14 with the second wraparound end 40 of wraparound member 36 positioned adjacent the second rod end 34. A detachable securement means 44 can be secured therebetween for biasing the wraparound member 36 into biased engagement with respect to the upper rail clamping member 24 to firmly wedge it into contact with the lower rail clamping means 18 and the seat post means 12. With this configuration adjustable securement of the longitudinally extending mounting rails of a conventional bicycle seat can be fixedly secured with respect to the seat post 12 of the present invention. Engagement of the wraparound member 36 with respect to the upper rail clamping means 24 can be facilitating by providing serrations in the arcuate portion of wraparound member which is adapted to engage the upper rail clamping means.

Securement between the first wraparound end 38 of wraparound member 36 and the first rod end 34 is best achieved by defining of a rod aperture means 42 in the first wraparound end 38. This rod aperture means 42 will be adapted to receive the rod means 38 extending therethrough prior to entry thereof into the hole means 14. The first wraparound end 38 will be movably secured with respect to the first rod end 32 by a wraparound retaining means 46 which can take the form of a lip means 48. Thus, with the rod means 30 extending through hole means 14 the first wraparound end 38 of wraparound member 36 will be movably retained therein and wedged between the lip means 48 and the side wall of the upper post end 16 immediately adjacent the hole means 14. As such the wraparound member 36 will be movably attached with respect to the rod 30.

To facilitate engagement of the wraparound member 36 with the upper rail clamping member 24 while extending therearound it is preferable that the upper rail clamping means 24 defines an upper guide channel means 50 therein. This upper guide channel means 50 will provide a channel into which the wraparound member 36 can extend and be detachably securable therein. The upper guide channel 50 will facilitate the direction of abutting force from the wraparound member 36 into engagement therewith to maintain securement of the mounting rails of the bicycle seat within the slots defined therein. Furthermore the upper guide channel 50 may include an upper guide base area 52 therein which may be serrated to further facilitate engagement of the upper rail clamping means 24 with respect thereto.

In a similar manner the lower rail clamping means 18 may define a lower guide channel means 54 adapted to receive the arcuate upper surface 58 of the upper post end 16 therein to facilitate engagement therewith. Furthermore the lower guide channel means 54 may include a lower guide base area 56 therein having a serrated surface to further enhance this engagement.

The detachable securement means 44 may take the form of a bolt means 62 which can extend through a securement aperture 60 defined within the second rod end 34 of rod 30. This bolt means 62 can then extend upwardly to be engageable with respect to the second wraparound end 40 of wraparound member 36.

In a preferred embodiment the configuration of the second wraparound end 40 may include a first ear means 64 and a second ear means 68 extending outwardly therefrom each defining a first ear orifice 66 and a second ear orifice 70, respectively, extending therethrough. The first ear orifice 66 and the second ear orifice 70 are preferably laterally registered with respect to one another such as to be able to receive a cylindrical nut means 72 positioned movably therein. This cylindrical nut means 72 preferably may define a nut bore 74 extending therethrough which may be threaded to facilitate engagement with respect to the bolt means 62. With the bolt means 62 extending through the securement aperture 60 in second rod end 34 and upwardly into engagement with respect to the nut bore 74 of cylindrical nut means 72 a means will be provided for adjustably clamping downwardly on the wraparound member 36 to affix securement of the longitudinally extending rails of a conventional bicycle seat 30 with respect to the seat post 12 while only requiring a single bolt or single attachment means while achieving such firm and yet variable attachment characteristics.

In operation, if the bolt means 62 of securement means 44 is slightly loosened, this will allow the configuration of the lower rail clamping member 18 and the upper rail clamping member 24 to still be retained immediately adjacent the upper post end 16 but to be rotatably movable therewith to vary the angle of positioning of the mounting rails 10 extending therethrough and thereby adjust vertically in a pivoting manner the position of the front or rear portion of the bicycle seat. This design provides ease of adjustment not present heretofore in other configurations requiring the tightening of multiple securement means of various types.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An adjustable wraparound bicycle seat post clamping apparatus with a single fastener, for use with a bicycle seat having longitudinally extending mounting rails, which comprises:
    A. a seat post means defining a hole means extending laterally therethrough, said seat post means defining an upper post end thereon;
    B. a lower rail clamping means positioned adjacent said upper post end of said seat post means and being adjustable with respect thereto, said lower rail clamping means defining a first lower rail clamping slot means and a second lower rail clamping slot means therein adapted to receive longitudinally extending mounting rails of a bicycle seat therein;
    C. an upper rail clamping means positioned adjacent said lower rail clamping means and defining a first upper rail clamping slot means immediately adjacent said first lower rail clamping slot means for retaining a longitudinally extending mounting rail of a bicycle seat therein, said upper rail clamping means further defining a second upper rail clamping slot means immediately adjacent said second lower rail clamping slot means for retaining another longitudinally extending mounting rail therein;
    D. a rod means extending through said hole means defined in said seat post means, said rod means including a first rod end and a second rod end;
    E. a wraparound member including a first wraparound end and a second wraparound end, said wraparound member defining a rod aperture means adjacent said first wraparound end thereof, said rod aperture means being adapted to receive said rod means extending therethrough to movably secure said first wraparound end of said wraparound member with respect to said first rod end of said rod means, said wraparound member being generally arcuate and extending from said first rod end of said rod means over and around said upper rail clamping means and said lower rail clamping means to the opposite side thereof with said second wraparound end being positioned adjacent the opposite side of said seat post means adjacent said second rod end of said rod means; and
    F. a detachable securement means adapted to attach said second rod end of said rod means with respect to said second wraparound end of said wraparound member, said detachable securement means being adapted to urge said wraparound member toward said second rod end to bias together said upper rail clamping means and said lower rail clamping means between said wraparound member and said upper post end of said seat post means to detachably retain longitudinally extending mounting rails therebetween.

2. An adjustable wraparound bicycle seat post clamping apparatus with a single fastener, for use with a bicycle seat having longitudinally extending mounting rails, as defined in claim 1 wherein said rod means further includes a wraparound retaining means adjacent said first rod end thereof adapted to retain moveable securement of said first wraparound end of said wraparound member with respect to said first rod end of said rod means.

3. An adjustable wraparound bicycle seat post clamping apparatus with a single fastener, for use with a bicycle seat having longitudinally extending mounting rails, as defined in claim 2 wherein said wraparound securement means comprises a lip means having an outside diameter greater than the inside diameter of said rod aperture means with said rod means extending through said rod aperture means with said first wraparound end positioned between said lip means and said seat post means for retaining thereof movably with respect to said first rod end of said rod means.

4. An adjustable wraparound bicycle seat post clamping apparatus with a single fastener, for use with a bicycle seat having longitudinally extending mounting rails, as defined in claim 1 wherein said upper rail clamping means defines an upper guide channel means therein adapted to receive said wraparound member extending therethrough and therealong to facilitate engagement of said upper rail clamping means with respect to said wraparound member.

5. An adjustable wraparound bicycle seat post clamping apparatus with a single fastener, for use with a bicycle seat having longitudinally extending mounting rails, as defined in claim 4 wherein said upper guide channel means includes an upper guide base area within said upper guide channel means adapted for abutment with said wraparound member positioned in said upper guide channel means, said upper guide base area being arcuate to facilitate engagement thereof with respect to said wraparound member.

6. An adjustable wraparound bicycle seat post clamping apparatus with a single fastener, for use with a bicycle seat having longitudinally extending mounting rails, as defined in claim 5 wherein said upper guide channel means is serrated to further facilitate engagement with respect to said wraparound member.

7. An adjustable wraparound bicycle seat post clamping apparatus with a single fastener, for use with a bicycle seat having longitudinally extending mounting rails, as defined in claim 1 wherein said lower rail clamping means defines a lower guide channel means therein adapted to engage said upper post end to facilitate engagement of said lower rail clamping means therewith.

8. An adjustable wraparound bicycle seat post clamping apparatus with a single fastener, for use with a bicycle seat having longitudinally extending mounting rails, as defined in claim 7 wherein said lower rail clamping means includes a lower guide base area within said lower guide channel means adapted for abutment with said upper post end positioned extending into said lower guide channel means, said lower guide base area being arcuate to facilitate engagement thereof with respect to said upper post end.

9. An adjustable wraparound bicycle seat post clamping apparatus with a single fastener, for use with a bicycle seat having longitudinally extending mounting rails, as defined in claim 8 wherein said lower guide base area is serrated to further facilitate engagement of said upper post end with respect to said lower rail clamping means.

10. An adjustable wraparound bicycle seat post clamping apparatus with a single fastener, for use with a bicycle seat having longitudinally extending mounting rails, as defined in claim 7 wherein said upper post end includes an arcuate upper surface adapted to be engageable with respect to said lower guide channel means to facilitate detachably securement of said lower rail clamping means with respect to said seat post means.

11. An adjustable wraparound bicycle seat post clamping apparatus with a single fastener, for use with a bicycle seat having longitudinally extending mounting rails, as defined in claim 1 wherein said rod means defines a securement aperture extending therethrough adjacent said second rod end thereof and wherein said detachable securement means includes a bolt means adapted to extend through said securement aperture and detachably secure said second rod end of said rod means with respect to said second wraparound end of said wraparound member.

12. An adjustable wraparound bicycle seat post clamping apparatus with a single fastener, for use with a bicycle seat having longitudinally extending mounting rails, as defined in claim 11 wherein said wraparound member includes:

A. a first ear means adjacent said second wraparound end, said first ear means defining a first ear orifice extending laterally therethrough;

B. a second ear means adjacent said second wraparound end and spatially disposed from said first ear means to define an ear slot means therebetween, said second ear means defining a second ear orifice extending laterally therethrough, said second ear orifice being spatially disposed from and in registration with respect to said first ear orifice;

C. a cylindrical nut means extending through said first ear orifice and said second ear orifice, said cylindrical nut means defining a nut bore therethrough adapted to receive said bolt means attached therein to secure said second wraparound end of said wraparound member with respect to said second rod end of said rod means.

13. An adjustable wraparound bicycle seat post clamping apparatus with a single fastener, for use with a bicycle seat having longitudinally extending mounting rails, as defined in claim 12 wherein said nut bore is threaded to facilitate engagement with respect to said bolt means.

14. An adjustable wraparound bicycle seat post clamping apparatus with a single fastener, for use with a bicycle seat having longitudinally extending mounting rails, as defined in claim 12 wherein said bolt means of said detachably securement means extends into said ear slot means to engage said nut bore.

15. An adjustable wraparound bicycle seat post clamping apparatus with a single fastener, for use with a bicycle seat having longitudinally extending mounting rails, as defined in claim 12 wherein said cylindrical nut means is movably mounting within said first ear orifice and said second ear orifice to be moveable with respect to said first ear means and said second ear means to facilitate engagement of said nut bore with respect to said bolt means.

16. An adjustable wraparound bicycle seat post clamping apparatus with a single fastener, for use with a bicycle seat having longitudinally extending mounting rails, as defined in claim 1 wherein said upper rail clamping means and said lower rail clamping means are identically shaped.

17. An adjustable wraparound bicycle seat post clamping apparatus with a single fastener, for use with a bicycle seat having longitudinally extending mounting rails, as defined in claim 1 wherein said first upper rail clamping slot means is oriented approximately parallel with respect to said second upper rail clamping slot means.

18. An adjustable wraparound bicycle seat post clamping apparatus with a single fasteners, for use with a bicycle seat having longitudinally extending mounting rails, as defined in claim 1 wherein said second upper rail clamping slot means is oriented approximately parallel with respect to said second upper rail clamping slot means.

19. An adjustable wraparound bicycle seat post clamping apparatus with a single fastener, for use with a bicycle seat having longitudinally extending mounting rails, as defined in claim 1 wherein said seat post means is tubular.

20. An adjustable wraparound bicycle seat post clamping apparatus with a single fastener, for use with a bicycle seat having longitudinally extending mounting rails, as defined in claim 1 wherein said detachable securement means comprises a single bolt member.

21. An adjustable wraparound bicycle seat post clamping apparatus with a single fastener, for use with a bicycle seat having longitudinally extending mounting rails, as defined in claim 1 wherein said wraparound member includes a serrated surface area adapted to abut said upper rail clamping means to facilitate engagement therewith.

22. An adjustable wraparound bicycle seat post clamping apparatus with a single fasteners, for use with a bicycle seat having longitudinally extending mounting rails, as defined in claim 1 wherein said first lower rail clamping slot means, said second lower rail clamping slot means, said first upper rail clamping slot means and said second upper rail clamping slot means are each generally V-shaped to facilitate retaining of the longitudinally extending mounting rails of a bicycle seat therein.

23. An adjustable wraparound bicycle seat post clamping apparatus with a single fastener, for use with a bicycle seat having longitudinally extending mounting rails, which comprises:

A. a tubular seat post means defining a hole means extending laterally therethrough, said seat post means including an upper post end thereon including an arcuate upper surface;

B. a lower rail clamping means positioned adjacent said arcuate upper surface of said upper post end of said seat post means and being movable with respect thereto, said lower rail clamping means defining a lower guide channel means therein and including a lower guide serrated base area located within said lower guide channel means being adapted to engage said arcuate upper surface of said seat post means to facilitate engagement of said lower rail clamping means therein, said lower rail clamping means defining a first lower rail clamping slot means and a second lower rail clamping slot means therein adapted to receive longitudinally extending mounting rails of a bicycle seat therein, said first lower rail clamping slot means and said second lower rail clamping slot means being V-shaped and extending approximately parallel with respect to each other;

C. an upper rail clamping means being of identical shape to said lower rail clamping means, said upper rail clamping means being positioned adjacent said lower rail clamping means and defining a first upper rail clamping slot means immediately adjacent said first lower rail clamping slot means for retaining a longitudinally extending mounting rail of a bicycle seat therein, said upper rail clamping means further defining a second upper rail clamping slot means immediately adjacent said second lower rail clamping slot means for retaining another longitudinally extending mounting rail therein, said upper rail clamping means defining an upper guide channel means therein, said upper rail clamping means also including an upper guide serrated base area in said upper guide channel means to facilitate engagement therewith, said first upper rail clamping slot means and said second upper rail clamping slot means being generally V-shaped and extending approximately parallel with respect to each other;

D. a rod means extending through said hole means defined in said seat post means, said rod means further including:

(1) a first rod end:
(2) a second rod end, said second rod end defining a securement aperture extending therethrough;
(3) a wraparound retaining means adjacent said first rod end, said wraparound retaining means including a lip means extending outwardly from said rod means;

E. a wraparound member being generally arcuate and extending from said first rod end of said rod means over and around, said upper rail clamping means through said upper guide channel means defined therein and in abutment with respect to said upper guide serrated base area to the opposite side thereof adjacent said second rod end, said wraparound member comprising:

(1) a first wraparound end defining a rod aperture means thereadjacent adapted to receive said rod means extending therethrough to movably secure said first wraparound end of said wraparound member with respect to said first rod end, said wraparound retaining means being adapted to retain moveable securement of said first wraparound end of said wraparound member with respect to said first rod end of said rod means, said lip means of said rod means being larger than said rod aperture means defined in said wraparound member to facilitate retaining of said rod means therein;
(2) a second wraparound end being positioned adjacent the opposite side of said seat post means adjacent said second rod end of said rod means;
(3) a first ear means adjacent said second wraparound end, said first ear means defining a first ear orifice extending laterally therethrough;
(4) a second ear means adjacent said second wraparound end, said second ear means being spatially disposed from said first ear means to define an ear slot means therebetween, said second ear means defining a second ear orifice extending laterally therethrough, said second ear orifice being spatially disposed from and in registration with respect to said first ear orifice;
(5) a cylindrical nut means being movable mounted extending through said first ear orifice and said second ear orifice, said cylindrical nut means defining a threaded nut bore therethrough to facilitate attachment of said wraparound member with respect to said second rod end of said rod means;
(6) a serrated surface area adapted to abut said upper rail clamping means to facilitate engagement therewith; and F. a detachable securement means comprising a single bolt means adapted to extend through said securement aperture of said rod means into said ear slot means into engagement with respect to said threaded nut bore of said cylindrical nut means on said second wraparound end of said wraparound member for attachment of said rod means with respect to said wraparound member, said detachable securement means being adapted to urge said wraparound member toward said second rod end to bias together said upper rail clamping means and said lower rail clamping means between said wraparound member and said upper post end of said seat post means to detachable retain the longitudinally extending mounting rails therebetween.

* * * * *